Patented Apr. 20, 1943

2,317,131

UNITED STATES PATENT OFFICE 2,317,131

FILM AND FILAMENT FORMATION

Rollin F. Conaway, Wilmington, Del., assignor to E. I. du Pont de Nemours & Company, Wilmington, Del., a corporation of Delaware No Drawing. Application December 31, 1940, Serial No. 372,675

10 Claims. (Cl. 18—54)

The present invention relates to cellulose esters and ethers and, more particularly, to the modification of cellulose esters and ethers, and, still more particularly, to the modification of cellulose esters and ethers by the incorporation of a modifying agent in solutions of the esters and ethers in organic solvents.

The general utility of cellulose esters and ethers as films, fibers, and molded articles is based upon their solubility in volatile organic solvents on the one hand and upon their thermoplasticity on the other. These fundamental properties permit the cellulose derivatives to be shaped readily into useful forms, yet these same properties give to the articles very low resistance to damage by organic solvents and high temperatures. Such ready susceptibility to damage limits the usefulness of all articles made from cellulose esters and ethers. For example, fabrics consisting in part or whole of cellulose acetate cannot be cleaned with the ordinary dry cleaning fluids, and they must be ironed at temperatures well below those at which cotton, wool, and viscose rayon are safe. In the past, these difficulties have been overcome to some extent by the partial hydrolysis of the ester groups, but this cannot be done without altering the highly desirable draping qualities of acetate fabrics or affecting dyeing properties. Also, it has been proposed to reduce the solubility and raise the softening point of cellulose derivatives by chemical modification. In general, however, it is possible to apply this type of modification only as a costly and sometimes undesirable after-treatment of the finished yarn, film, or molded article.

This invention has as an object the provision of a method whereby cellulose esters and ethers can be formed directly into useful articles characterized both by insolubility and infusibility. A further object is the provision of a method of accomplishing this without materially affecting the solubility or the thermoplasticity of the cellulose derivative previous to its being shaped into a useful form. Other objects will appear hereinafter.

These objects are accomplished by the following invention wherein a solution of a cellulose derivative soluble in organic solvents and having esterifiable hydroxyl groups and a dialkyl ether of dimethylolurea in an inert organic solvent is formed into a shaped object, e. g., a film or fiber, by casting or spinning followed by evaporation of the solvent. When free of solvent, the composition is then subjected to a suitable baking, for example, 90 minutes at 140° C. The products which are thus obtained are modified cellulose derivatives characterized by insolubility in organic solvents and infusibility at elevated temperatures.

Although the effect of the modification is apparent in various properties, the outstanding characteristics of the treated products are insolubility in organic solvents and elevated softening point, which is made evident by loss of thermoplasticity at high temperatures. At 250° C. a modified sample of cellulose acetate remains infusible, whereas the original unmodified material fuses to a liquid melt. Since the modifying effect may prevent the subsequent shaping of the isolated cellulose derivative, the usual procedure is to cast the solution into a film or spin it into fibers before the evaporation of solvent takes place. Though based upon the same principle, the actual procedure depends upon whether the modified product is desired in the form of a film or fiber.

To prepare the modified film, a solution is made up which, for example, consists of 15 per cent, by weight, of cellulose acetate (54.5 per cent combined acetic acid) and 85 per cent, by weight, of acetone. Before adding the cellulose acetate to the acetone, an amount of the dimethyl ether of dimethylolurea (s-bis-(methoxymethyl) urea) equal to 10 per cent of the former is dissolved in the latter. When this solution is cast into a film by any of the well known methods, and the acetone completely removed by aging for three days in an oven at 65° C., a perfectly clear film is obtained. The film, which at this point is readily soluble in acetone, is then subjected to baking for 2 hours at 150° C., after which it is found to be completely insoluble in acetone. If, on the other hand, a fibrous product is desired, a solution is prepared which, for example, consists of 22.5 per cent of the same cellulose acetate, 75 per cent acetone, and 2.5 per cent of the dimethyl ether of dimethylolurea. In the preparation of this solution, the required amount of the dimethylolurea ether is dissolved first in about half the required amount of acetone and filtered to remove the small amount of insoluble material generally present. To this solution of the modifier there is added the necessary amounts of acetone and cellulose acetate to make up the desired solution. In order to hasten the solution process, the materials should be properly agitated and kept at a temperature of 35–40° C. When the solution is complete, it is filtered through a triple layer of cotton wadding under a pressure of 200 lbs. per sq. in. in order to remove all traces of insoluble residue. The filtrate may then be spun by extrusion under pressure of 300–400 lbs. per sq. in. through a multiplicity of fine holes into a chamber through which passes a current of hot air to evaporate the acetone. The multiplicity of filaments thus formed are wound up continuously on the surface of a revolving drum at a speed which is equivalent to or just slightly greater than that at which the modified cellulose acetate is extruded. In this manner, there is spun a continuous filament yarn (100 denier and 40 filaments in the above example). It is then twisted so as to contain 4 turns per inch. At this stage, the modified yarn is readily soluble in acetone and possesses a tenacity about 15–16 per cent lower than an exactly similar unmodified yarn. The modified yarn which thus contains about 10 per cent of dimethylolurea ether is then suspended in skein form in a forced draft oven at 160° C. for 90 minutes. The effect of this treatment is shown immediately by the insolubility of yarn in acetone and its infusibility at 250° C. At the same time, the tenacity of the yarn is restored to about the same value possessed by an exactly similar unmodified yarn.

The more detailed practice of the invention is illustrated by the following examples, wherein parts given are by weight. There are of course many forms of the invention other than these specific embodiments. In the first three, there is shown the use of different ethers of dimethylolurea and in varying amounts. Examples IV and V demonstrate the application to cellulose acetate of both higher and lower combined acetic acid. The next three examples illustrate the application to esters other than the acetate and to a typical ether. Example IX illustrates the invention as applied to a plasticized composition. Examples X, XI and XII cover the modification of cellulose acetate yarn, illustrating different dimethylolurea ethers and different concentrations. Example XIII discloses the use of a catalyst.

*Example I*

A solution of 15 parts of cellulose acetate (54.5 per cent combined acetic acid) and 1.5 parts of the diisobutyl ether of dimethylolurea in 85 parts of acetone is cast into a film by spreading on plate glass with a doctor knife. The dry film is removed from the plate after overnight exposure to a dry atmosphere, and the residual solvent is removed by a three-day aging of the film at 65° C. The film is then heated at 175° C. for three minutes. In contrast to an unmodified film which is completely soluble in acetone and melts below 250° C., the film prepared in the above manner is insoluble in acetone and does not melt at 250° C. The modified film is of excellent clarity and in appearance indistinguishable from unmodified film.

*Example II*

A solution of 15 parts of cellulose acetate (54.5 percent combined acetic acid) and one part of the dimethyl ether of dimethylolurea in 85 parts of acetone is cast to a film as described in Example I and then heated at 160° C. for 90 minutes. This film is perfectly clear and, though indistinguishable in appearance from an unmodified cellulose acetate film, is insoluble in acetone. This film does not fuse at 240–250° C. at which temperature an unmodified film quickly melts.

*Example III*

From a solution of 15 parts by weight of cellulose acetate (same as Example II) and 0.6 part of diethyl ether of dimethylolurea in 85 parts of acetone a film is prepared in the same manner as described in Example I and then heated at 140° C. for 45 minutes. This film, though indistinguishable in appearance from unmodified cellulose acetate film, is insoluble in acetone.

*Example IV*

A film is prepared from a solution of 15 parts by weight of cellulose acetate (56.7 per cent combined acetic acid) and 1.5 parts of dimethyl ether of dimethylolurea in 85 parts of acetone in the same manner as described in Example I and then heated for one hour at 140° C. This film, though indistinguishable in appearance from unmodified cellulose acetate film, is insoluble in acetone.

*Example V*

A film is prepared from a solution of 15 parts by weight of cellulose acetate (52 per cent combined acetic acid) and 1.5 parts of the diisobutyl ether of dimethylolurea in 85 parts of acetone in the same manner as described in Example I and then heated for one hour at 140° C. This film, though indistinguishable in appearance from unmodified cellulose acetate film, is insoluble in acetone and does not melt at 250° C.

*Example VI*

From a solution of 15 parts by weight of cellulose acetate propionate and 1.5 parts of dimethyl ether of dimethylolurea in 85 parts of acetone there is made a film in the same manner as described in Example I, which is then heated at 140° C. for one hour. This film, though indistinguishable in appearance from an unmodified film of cellulose acetate propionate, is not soluble in acetone.

*Example VII*

A film is made from a solution of 15 parts by weight of cellulose nitrate (11.06 per cent nitrogen) and 1.5 parts of the dimethyl ether of dimethylolurea in 85 parts of acetone in the same manner as described in Example I and then heated for one hour at 140° C. This film, though indistinguishable in appearance from an unmodified cellulose nitrate film, is insoluble in acetone.

*Example VIII*

A film is made from a solution of 15 parts by weight of ethyl cellulose (46–48 per cent ethoxy content) and 1.5 parts of the dimethyl ether of dimethylolurea in 85 parts of a solvent which consists of 20 parts by weight of ethyl alcohol and 80 parts of toluene, in the same manner as described in Example I and then heated for one hours at 140° C. This film is insoluble in the above mixture of ethyl alcohol and toluene.

*Example IX*

A film is made from a solution of 15 parts by weight of cellulose acetate (54.5 per cent combined acetic acid), 6.6 parts of dimethyl phthalate, and 1.5 parts of the diisobutyl ether of dimethylolurea in 85 parts of acetone in the same manner as described in Example I. The film is then cut up into small pieces about one centimeter square which are subjected in a steel mold to a temperature of 160° C. and a pressure of 5000 lbs./per sq. in. for a period of 15 minutes. The molded article, though indistinguishable in appearance from a similar article which has been made from a combination containing no dimethylolurea ether, is insoluble in acetone.

Example X

A solution is prepared by dissolving 22.5 parts by weight of cellulose acetate (54.5 per cent combined acetic acid) and 2.5 parts of the diisobutyl ether of dimethylolurea in 75 parts of acetone. After filtering to remove all traces of insoluble residue, the solution is dry-spun into a continuous filament yarn of 100 denier and 40 filaments, i. e., the solution is extruded under a pressure of 300–400 lbs./per sq. in. and at a temperature of about 59° C. through the desired number of fine holes into a chamber through which passes a current of hot air. The multiplicity of fine filaments thus formed is wound up continuously on the surface of a revolving drum at a speed which is equivalent to or just slightly greater than that at which the modified cellulose acetate is extruded. After twisting so that it contains a twist of 4 turns per inch, the yarn is given a baking of 2 hours at 150° C. When tested the yarn is completely insoluble in acetone in contrast to unmodified cellulose acetate yarn which dissolves very readily in this solvent. The modified yarn has a tenacity which is essentially equivalent to that which is possessed by a similar but unmodified yarn. The modified yarn when woven into a fabric gives a material which withstands without damage, except for slight discoloration, ironing at a temperature of 240–250° C., under which conditions ordinary unmodified cellulose acetate fabric is badly fused and torn by adhesion to the iron.

Example XI

A solution is prepared by dissolving 22.5 parts by weight of cellulose acetate (54.5 per cent combined acetic acid) and 2.5 parts of the dimethyl ether of dimethylolurea in 75 parts of acetone. After filtering to remove all traces of insoluble residue, the solution is spun into a 100-denier, 40 filament yarn by the method described in Example X. When twisted 4 turns per inch, the yarn is given a baking of 1½ hours at 160° C. The modified yarn, which is produced in this way, is completely insoluble in acetone, whereas similar but unmodified yarn dissolves readily. On testing, the modified yarn has a tenacity (1.58 g./d.) which is essentially equivalent to that which is possessed by similar but unmodified yarn (1.54 g./d.). The modified yarn when woven into a fabric gives a material which withstands without damage, except for slight discoloration, ironing at 240–250° C., under which conditions ordinary unmodified cellulose acetate fabric is badly fused and torn by adhesion to the iron.

Example XII

A solution prepared by dissolving 57 parts by weight of cellulose acetate (54.5 per cent combined acetic acid) and 3 parts of the dimethyl ether of dimethylolurea in 180 parts of acetone, is filtered and spun into 100-denier, 40-filament yarn by the method described in Example X. When twisted four turns per inch, the yarn is given a baking of 1½ hours at 140° C. The modified yarn which is produced in this way is substantially insoluble in acetone, whereas similar but unmodified yarn dissolves completely. On testing, the modified yarn has a tenacity (1.53 g./d.) which is essentially equivalent to that which is possessed by similar but unmodified yarn (1.54 g./d.). The modified yarn fully retains its fibrous character, and the filaments remain unfused when heated to a temperature of 250° C., under which conditions the same but unmodified yarn is fused to a stiff, brittle mass.

Example XIII

A solution is prepared by dissolving 2250 parts by weight of cellulose acetate (54.5 per cent combined acetic acid) and 250 parts of the dimethyl ether of dimethylolurea in 7400 parts of acetone. After filtering to remove all traces of insoluble residue, 2.5 parts of phthalic anhydride dissolved in 100 parts of acetone is added to the solution with thorough mixing. The solution is then spun into a 100-denier, 40-filament yarn by the method described in Example X. When twisted 4 turns per inch, the yarn is given a baking of one hour at 140° C. The modified yarn which is produced in this way is substantially insoluble in acetone, whereas similar but unmodified yarn dissolves completely. On testing, the modified yarn has a tenacity (1.48 g./d.) which is essentially equivalent to that (1.54g./d.) of a similar but unmodified yarn. The modified yarn fully retains its fibrous character and the filaments remain unfused when heated to 250° C. under which conditions the same but unmodified yarn is fused to a stiff, brittle mass.

The process of the present invention may be carried out with any dialkyl ether of dimethylolurea which is soluble in an organic liquid which is also a solvent for the cellulose ester or ether to be modified, including, in addition to the dimethyl, the diethyl, and the diisobutyl ethers of the examples, the dipropyl, the diisopropyl, the dibutyl, the diamyl, the diisoamyl, the dihexyl, the diheptyl, and the mixed ethers such as the methyl ethyl and the ethyl hexyl. Cycloaliphatic ethers such as the dicyclohexyl ether are also operable. For reasons of availability and greater solubility, ethers derived from lower alcohols, i. e., alcohols of up to six carbon atoms, are greatly preferred.

The above ethers of dimethylolurea may be reacted in the practice of this invention with any cellulose derivative having the cellulosic nucleus and esterifiable hydroxyls which is soluble in an organic solvent including, in addition to the cellulose acetate of the examples, also any organic solvent soluble hydroxyl containing cellulose derivative whether ester, ether, or mixed ether ester, e. g., cellulose formate, cellulose propionate, cellulose butyrate, cellulose acetate propionate, ethyl cellulose, benzylcellulose, butylcellulose, cellulose nitrate, and cellulose acetate nitrate.

For the most part, acetone serves as the most desirable solvent, but in the case of these cellulose derivatives which are not soluble in acetone, other solvents can be used. Thus, a toluene-alcohol mixture may be used as the common solvent for incorporating the dimethylolurea ether in ethyl cellulose. Among the many other solvents which can be used, there may be named chloroform, ethyl acetate, dioxane, benzyl alcohol, methyl Cellosolve, diacetone alcohol, and such mixed solvents as chloroform-alcohol, ethyl acetate-alcohol, benzene-alcohol, methylene chloride-ethyl alcohol. Any inert organic solvent for the particular cellulose derivative and the particular dialkyl ether of dimethylolurea used may be employed. The usefulness of any given solvent depends on the particular cellulose ether or ester and the particular dimethylolurea ether in question. Whenever possible the more volatile solvents are the more desirable since their use facilitates both the casting of films and the spinning of fibers. At the same time, the higher boiling and less volatile compounds serve equally well in casting and spinning at higher temperatures.

The preferable concentration of the solution may be determined by practical considerations with respect to casting films and spinning filaments. Thus, although the concentration may exceed 25 per cent, this has proved to be a very satisfactory concentration for spinning of yarn. Similarly, 15 per cent concentration has been found very useful for film casting. However, concentrations both above 25 per cent and below 15 per cent may be equally well used except insofar as the viscosity prevents the satisfactory formation of films and filaments. The proportion of dimethylolurea ether to cellulose derivative also varies over wide ranges. The limits are fixed only by the compatibility of the ingredients of the modified composition, which will vary with the particular components being used. Also, the amount of dimethylolurea ether will depend on the effect which is desired. In general, 10 per cent of the modifier based on the cellulose derivative suffices to give a satisfactory effect and in many cases smaller amounts serve equally well. Depending on the cellulose derivative in question and on the particular dimethylolurea ether, the proportion of the latter may vary from about one to about twenty per cent. However, these cannot be regarded as absolute limits.

Although the invention has been described chiefly in terms of a composition consisting of a cellulose derivative and a dimethylolurea ether which are brought into intimate association with one another by means of a common solvent, other ingredients may also be added. Thus a plasticizer such as dimethyl phthalate, dimethoxyethyl phthalate, or triphenyl phosphate or a mixture of these may be added to the solution. It is also permissible to add small amounts of water.

The conditions of baking may also be varied within a wide range. Temperatures may vary from as low as 50° C. to as high as the thermal stability of the cellulose derivative will permit. At the lowest temperatures long periods of time extending to many days are required, whereas at the highest temperatures only a few minutes may be needed. Typical conditions which have proved useful are 30 minutes at 170° C., 90 minutes at 160° C., or 240 minutes at 140° C. Also, the most desirable conditions depend upon the particular composition in hand. In place of a dry-baking treatment, the modified composition may be immersed in a hot inert organic liquid for a suitable period of time. In this case, conditions will be generally the same as when the dry-baking process is employed and a liquid which is a nonsolvent for both the cellulose derivative and the dimethylolurea ether should be used, such as a high-boiling hydrocarbon, for instance, kerosene.

It is possible to reduce the required period of baking by adding to the modified solution a small amount of acidic material. Thus, one per cent of phthalic anhydride based on the weight of dimethylolurea ether may be added, in which case a baking period of one hour at 140° C. gives the same effect as 1½ hours at 140° C. when the acid catalyst is not used. Other compounds which may be used in the same way include phthalic acid, citric acid, and ammonium iodide and in general any weak acid or acid reacting material. The amount of such material which can be used depends on its particular activity and on how soon it will be possible either to cast or spin the modified solution. Thus, the presence of this material or catalyst causes the viscosity to increase, an effect which must be kept under control in order to permit the successful formation of film or fibers.

The products of the present invention find use in films, molded articles, and textiles. In all of these uses, the improved properties of the products of this invention, e. g., the insolubility in organic solvents and the infusibility at elevated temperatures which are characteristic of these products, give additional advantages over those which the unmodified products possess in the many uses to which they are particularly suited. In general, the products of this invention are especially useful since they are highly resistant to the damaging effect of both organic liquids and high temperatures. Indeed, the use of any article made of a cellulose derivative has hitherto been extremely restricted where there is a probability of exposure either to organic liquids or high temperatures. The products of this invention largely overcome these restrictions and extend considerably the use of articles made from cellulose derivatives. Cellulose derivatives modified according to this invention are of particular value in the manufacture of textiles. For instance, the modified cellulose acetate in the form of yarn can be woven or knitted into fabrics which are highly resistant to organic solvents. Not only are they unaffected by accidental exposure to such a solvent as acetone, but they do not require the use of special dry-cleaning fluids as is now the case for ordinary acetate materials. Furthermore, the infusibility of the products prevents the damage caused to acetate fabrics when ironed at temperatures which are perfectly safe for other well known textile materials such as cotton and viscose rayon.

The above description and examples are intended to be illustrative only. Any modification of or variation therefrom which conforms to the spirit of the invention is intended to be included within the scope of the claims.

What is claimed is:

1. Process for preparing shaped objects of cellulose derivatives with decreased fusibility and solubility in organic solvents which comprises forming a solution in an organic solvent of a hydroxyl-containing cellulose derivative and from one to twenty per cent, based on the cellulose derivative, of a monomeric alkyl ether of dimethylolurea into a shaped article, evaporating the solvent from said shaped article and baking the same until the product is insolubilized.

2. Process of claim 1 wherein the cellulose derivative is an incompletely substituted cellulose acetate.

3. Process of claim 1 wherein the cellulose derivative is an incompletely substituted cellulose acetate, and the dimethylolurea ether is a diether of an alkanol of up to six carbon atoms.

4. Process of claim 1 wherein the cellulose derivative is an incompletely substituted cellulose acetate, and the dimethylolurea ether is the dimethyl ether.

5. Process which comprises spinning a solution, in an organic solvent, of a hydroxyl-containing cellulose derivative and from one to twenty per cent, based on the cellulose derivative, of a monomeric dialkyl ether of dimethylolurea and baking the filaments thus obtained.

6. Process of claim 5 wherein the cellulose derivative is an incompletely substituted cellulose acetate.

7. Process of claim 5 wherein the cellulose derivative is cellulose acetate and the dimethylolurea ether the dimethyl ether.

8. Process which comprises casting a film from a solution, in an organic solvent, of a hydroxyl-containing cellulose derivative and from one to twenty per cent, based on the cellulose derivative, of a monomeric dialkyl ether of dimethylolurea and baking the film thus obtained.

9. Process of claim 8 wherein the cellulose derivative is an incompletely substituted cellulose acetate.

10. Process of claim 8 wherein the cellulose derivative is cellulose acetate and the dimethylolurea ether the dimethyl ether.

ROLLIN F. CONAWAY.